May 22, 1951 H. S. BEAMESDERFER ET AL 2,554,002
CHECK VALVE
Filed Aug. 30, 1947 2 Sheets-Sheet 1
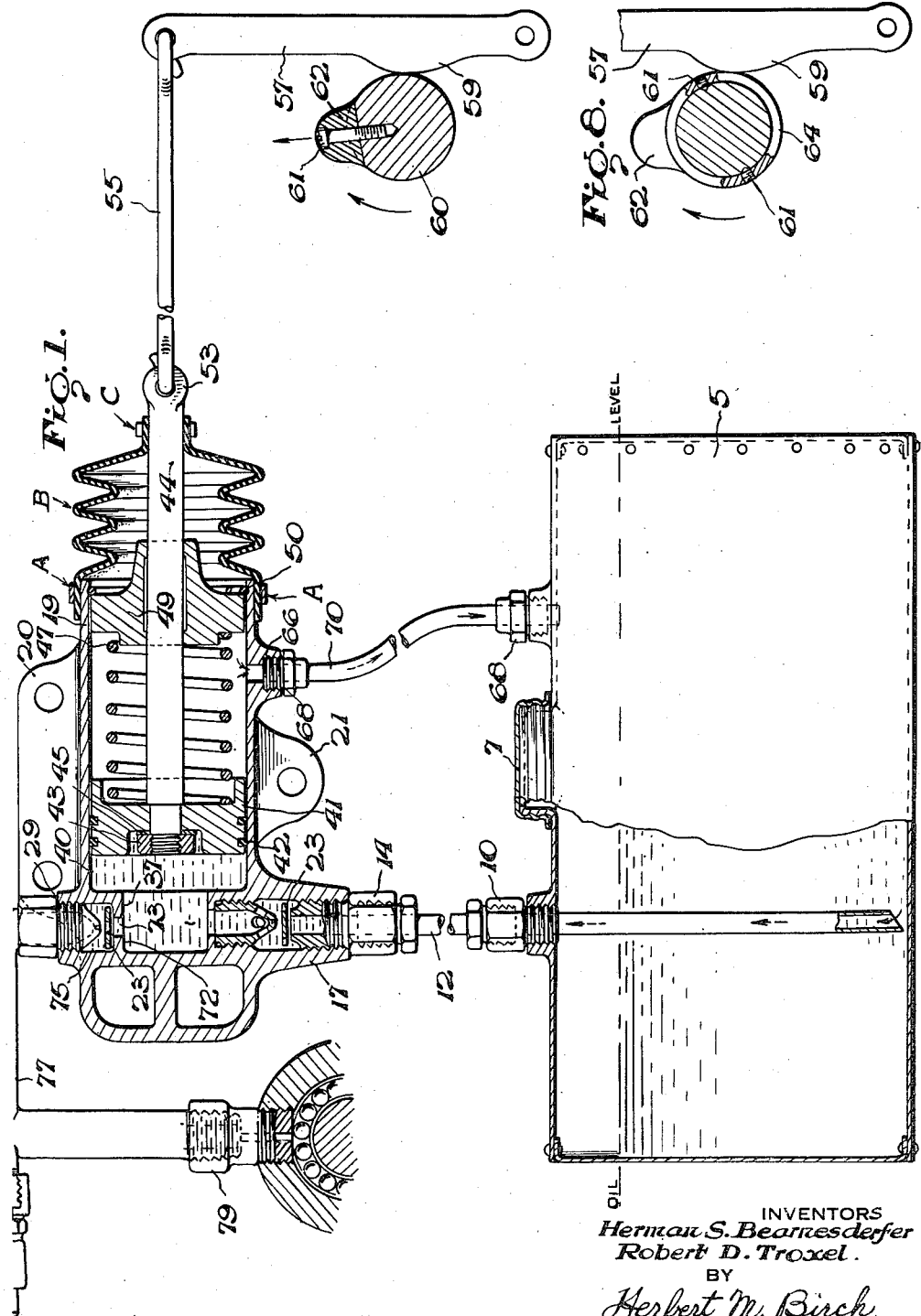
INVENTORS
Herman S. Beamesderfer
Robert D. Troxel.
BY
Herbert M. Birch
ATTORNEY May 22, 1951     H. S. BEAMESDERFER ET AL     2,554,002
CHECK VALVE
Filed Aug. 30, 1947     2 Sheets-Sheet 2
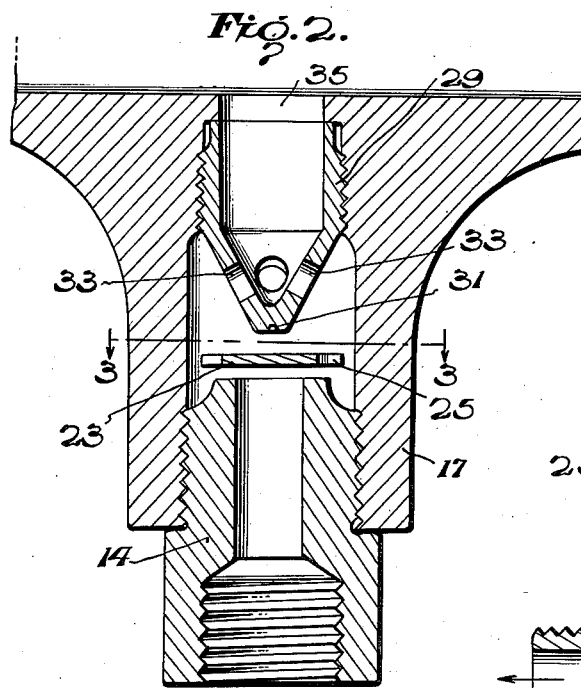
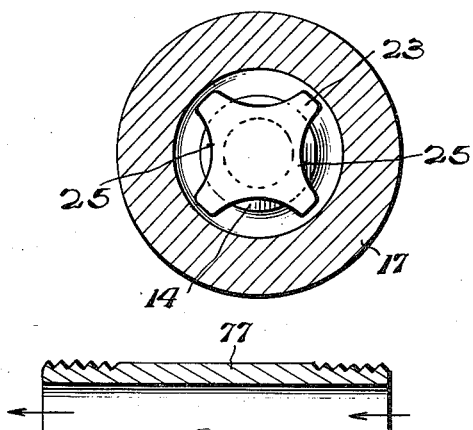
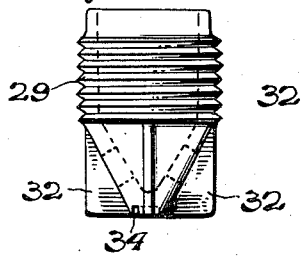
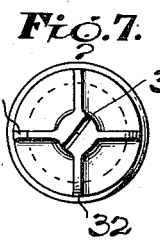
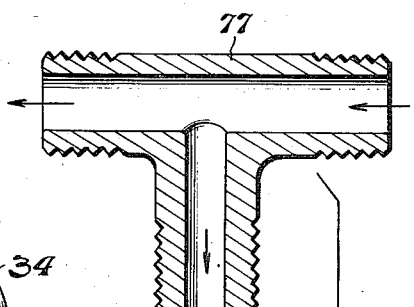
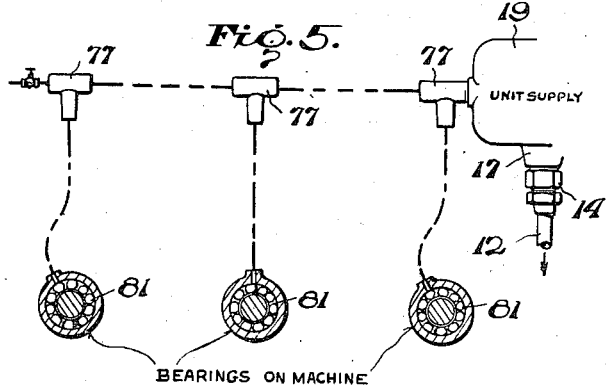
INVENTORS
Herman S. Beamesderfer
Robert D. Troxel
BY
Herbert M. Birch
ATTORNEY Patented May 22, 1951

2,554,002

UNITED STATES PATENT OFFICE 2,554,002

CHECK VALVE

Herman S. Beamesderfer and Robert D. Troxel, Sheridan, Pa.

Application July 30, 1947, Serial No. 764,706

1 Claim. (Cl. 251—127)

The present invention relates to improvements in a pump valve.

With this improvement in view which will become apparent as the invention is fully understood, the same resides in the novelty of construction, combination and arrangement of elements hereinafter specifically described and distinctly claimed in the appended claim.

The description should be read in connection with the accompanying drawing wherein:

Figure 1 is an elevation largely in section of the preferred embodiment of our invention applied to a bearing and controlled by a shaft;

Figure 2 is an enlarged diametrical detail section of the inlet valve;

Figure 3 is a transverse detail section on line 3—3 of Figure 2;

Figure 4 is a longitudinal diametrical section of the connected parts adapted to form a connection between the pump and a plurality of bearings to be lubricated;

Figure 5 is a somewhat diagrammatic view of an arrangement whereby several bearings are lubricated by one automatic oiling system;

Figure 6 is a modified form of the inlet valve in side elevation;

Figure 7 is an end view of such modified form;

Figure 8 is a modified form of the lug carried by the driving shaft.

In the drawings in which like characters of reference designate like or similar elements throughout the several views, Figure 1 shows a tank 5 of any desired shape and filled with lubricating oil. In the top of the tank is a hole surrounded by an exteriorly threaded outwardly extending short nipple closed by an interiorly threaded cap 7.

On either side of this cap is a short nipple with interior threads and connected to the top of the tank and forming a continuation of a hole in the tank top. The short nipple to the left of the filler hole described threadedly engages the exteriorly threaded lower portion of a coupling 10 through which extends a pipe 12 having an open lower end adjacent the tank bottom. This pipe is also disposed through another coupling 14, which includes an exteriorly threaded portion coacting with the interior threads of a tubular boss 17.

The same is integral with and extends radially from a generally cylindrical hollow body or housing 19 also provided with apertured flanges 20 and 21, whereby the body may be attached to a support (not shown) in a desired position. Within the boss 17 and above the threaded portion of coupling 14 is a valve chamber in which a flat plate 23 is movably disposed (Figures 2 and 3). The shape of the plate is illustrated in the latter figure and may be considered as resulting from the provision of spaced curved notches 25 in the edge of an originally circular plate.

The generally uniform plate 23 is adapted to be supported by the upper flat end of the exteriorly threaded portion of coupling 14, but may be lifted therefrom by suction.

The space or chamber previously described and formed within the boss 17 and inwardly of and above the interior threads thereof commnicates with a threaded radial bore formed in the left hand end of the body. In assembled condition this bore is occupied by an inlet sleeve 29 the exterior threads of which engage with the interior threads of the bore. The lower part of the sleeve has generally the shape of an inverted and truncated pyramid the apex portion of which has been cut off and which presents a flat surface 31 limiting the upward movement of the plate 23. Each of the four angularly related walls of the pyramidal sleeve portion is provided with an opening 33. Each opening is so located that its vertical diametrical plane is identical with the vertical plane bisecting a notch 25, so that the liquid flowing through the central part of a notch is directed towards one of the openings 33.

The inner open end of inlet sleeve 29 abuts against a shoulder bounding the threaded bore and its interior surface is flush with an opening 35 leading to a pump chamber 37.

Figures 6 and 7 show a modified form of valve sleeve 29 which is distinguished from the form of Figures 2 and 3 by the formation of ribs each forming a radial extension of the intersection of two adjacent pyramidal surfaces. Each of the ribs is bounded by edges respectively parallel to and at right angles to the axis of the sleeve. The axial junction of the ribs has a diametrical notch 34 for the blade of a screw driver or the like.

The radial edges of the ribs 32 limit the angle of tilting of the valve plate 23.

The pump chamber 37 has an open right-hand end in communication with the left-hand end of a coaxial piston chamber 40 of a diameter larger than the diameter of the pump chamber. A piston 41 is slidably arranged within its chamber and provided with grooves each for a ring 42 preferably of metal to prevent the passage of the liquid pumped from chamber 40 to the right-hand side of the piston.

A socket opens through the left-hand face of the piston and receives a nut 43 threaded upon the left-hand end portion of a piston rod 44 which is inserted in a central hole in the piston. The nut 43 bears against the washer 45 and presses same against the bottom of the socket.

In the right-hand side of the piston is formed a socket receiving the left-hand end of a coil spring 47 coiled around the piston rod and having a right-hand end wound about a lug of a cylinder head 49. The same is held within the body by a ring 50 seated within a groove formed upon the inner surface of the cylindrical body near the right-hand end thereof. The head 49 has a central bore for the piston rod. The intermediate part of the bore is widened to permit the formation of an oil film lubricating the piston rod.

The outer or right-hand end of the piston rod is formed by an eye 53 which is interlinked with an eye of a connecting rod 55. The right-hand end of the same is pivoted to the upper end of a lever 57 fulcrumed upon its outer end and having upon its left-hand side a lug 59.

The spring 47 urges the lug against a shaft 60 radially tapped for the threaded end portion of a bolt 61. The unthreaded part of this bolt is received in a central opening of a complementary lug or protuberance 62 which bears against a flattened shaft part and in certain positions of the shaft engages the lug 59 and swings the lever 57 clockwise, thereby compressing the spring.

Figure 8 shows a modified form of the means for securing the protuberance 62 to its shaft. This means takes the form of a ring 64 carrying the protuberance and at least partially surrounding the shaft and fixed thereto by bolts 61.

Realizing that even the best fitting piston rings may permit the passage of pressure liquid to the wrong side of a piston, means have been provided to gather such liquid. A radial extension 66 is tapped for engagement with a coupling 68 which connects a vent pipe 70 to the interior of the cylinder. The other end of the pipe is connected by a similar coupling to a nipple of the tank receiving the pressure liquid finding its way to the right side of the piston.

The left-hand end of pump chamber 37 is bounded by a wall 72 provided with an opening 73 which during the outward stroke of the piston is closed by an outlet valve plate 23 (Figures 2 and 3). The same moves during the inward stroke of the piston against the flattened generally pyramidal end of an outlet valve sleeve 29 of the preferred (Figure 2) or modified (Figures 6 and 7) form. The threaded cylindrical part of the sleeve is engaged within the tapped interior of a cylindrical extension 75 integral with the wall 72 and also extending beyond the left-hand end of its valve sleeve. The interior threads of the extension not engaged by such valve sleeve are engaged with the exterior threads of one cross arm of a T-shaped pipe 77. The threaded stem of the T-pipe is screwed into a coupling 79, which by its exterior threads may be inserted in a radial hole formed in an outer bearing race 81, which is to be lubricated. The remaining cross arm of the T-pipe is connected to one cross arm of a second T-pipe the stem of which leads to a second bearing. Thus a plurality of bearings may be lubricated from a single device (Figure 5).

The turning of shaft 60 causes the periodic swing of lever 57, which is swung in the opposite direction by the expansion of spring 47. The movement of the piston to the right causes liquid to be sucked into the pump chamber and piston movement to the left forces the liquid through the T-pipe. Any pressure liquid which has escaped to the right hand side of the piston is conducted by the vent pipe back to the tank and thus boosts the operation by increasing the hydrostatic pressure at the lower end of the suction pipe.

While the foregoing description describes and the accompanying drawing illustrates the specific details of the preferred and modified embodiments of our invention, we desire it to be understood that this disclosure is a mere example and not a limitation of our invention, the scope of which is expressed by the subjoined claim. For example, the several T-pipes may have various sized metering orifices to the bearings, if desired. Also, a boot or flexible sleeve B may be mounted over the end of the piston housing by means of a flat holding spring A and over the piston shaft by a similar smaller flat spring C. This boot is to prevent dust or any foreign matter from settling on the shaft and causing it to stick.

What we claim is:

A valve structure comprising a housing, a sleeve in the housing and including a pyramidal truncated portion with a flat apex and having openings in its converging faces and including radial ribs each bisecting the angle between adjacent pyramidal faces and having an outer end coplanar with the flat apex, a chamber in the housing and receiving the pyramidal portion, a valve member movable in the chamber and in one limiting position engaging the flat apex of the pyramidal sleeve portion, and a passage leading to the chamber and closed by the valve member in another limiting position.

HERMAN S. BEAMESDERFER.
ROBERT D. TROXEL.

REFERENCES CITED

The following references are of record in the file of this patent:

UNITED STATES PATENTS

| Number | Name | Date |
|---|---|---|
| 662,154 | Schmick | Nov. 20, 1900 |
| 1,111,906 | Keppel | Sept. 29, 1914 |
| 1,423,323 | Hazard | July 18, 1922 |
| 1,516,846 | Dever | Nov. 25, 1924 |
| 1,575,280 | Reynolds | Mar. 2, 1926 |
| 1,658,424 | Yerkes | Feb. 7, 1928 |
| 1,797,280 | Zerk | Mar. 24, 1931 |
| 1,852,229 | Blanchard | Apr. 5, 1932 |
| 1,915,694 | Reindel | June 27, 1933 |
| 1,929,310 | Greve | Oct. 3, 1933 |
| 1,993,732 | Bijur | Mar. 12, 1935 |
| 2,005,954 | Petersen et al. | June 25, 1935 |
| 2,083,903 | Bijur | Dec. 15, 1936 |
| 2,247,568 | Armbrust | July 1, 1941 |
| 2,359,486 | Magis | Oct. 4, 1944 |

FOREIGN PATENTS

| Number | Country | Date |
|---|---|---|
| 621,137 | Great Britain | of 1949 |